June 13, 1967  D. J. McCARTHY ETAL  3,325,166
CHUCK JAW GUIDE MEANS
Original Filed Jan. 3, 1964  3 Sheets-Sheet 1
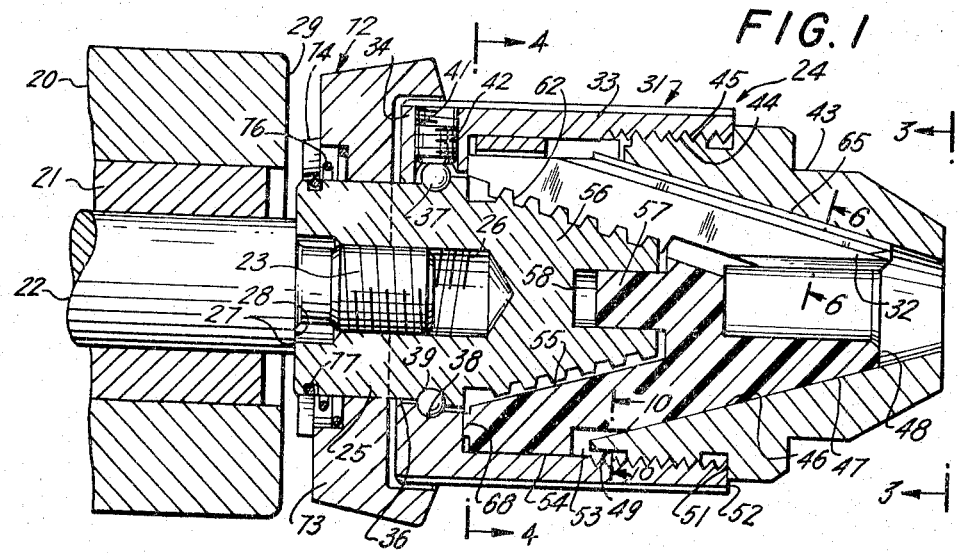
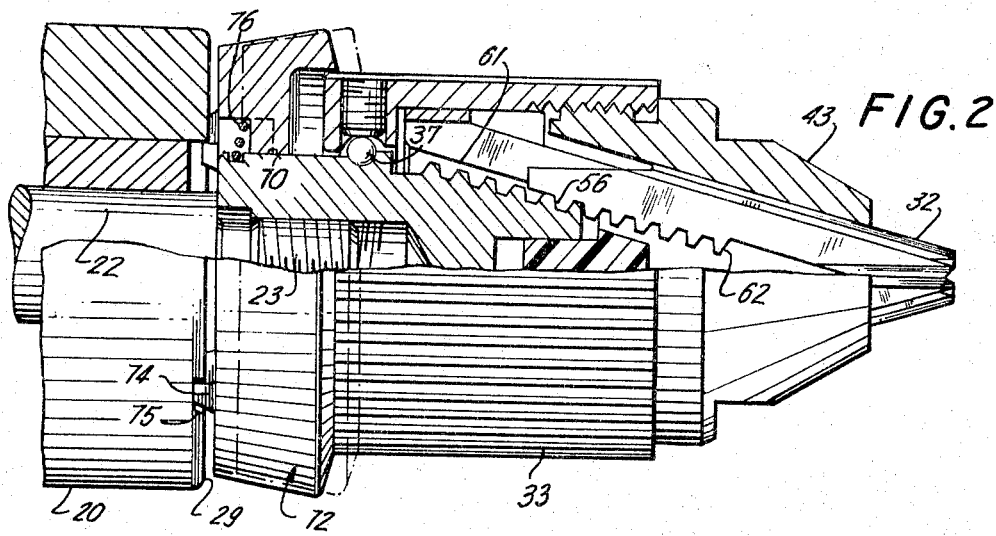
INVENTORS.
GIRARD S. HAVILAND
DONALD J. McCARTHY
BY
*Stephen J. Rudy*
ATTORNEY June 13, 1967 D. J. McCARTHY ET AL 3,325,166
CHUCK JAW GUIDE MEANS
Original Filed Jan. 3, 1964
3 Sheets-Sheet 2

INVENTORS.
GIRARD S. HAVILAND
DONALD J. McCARTHY
BY
Stephen J. Rudy
ATTORNEY

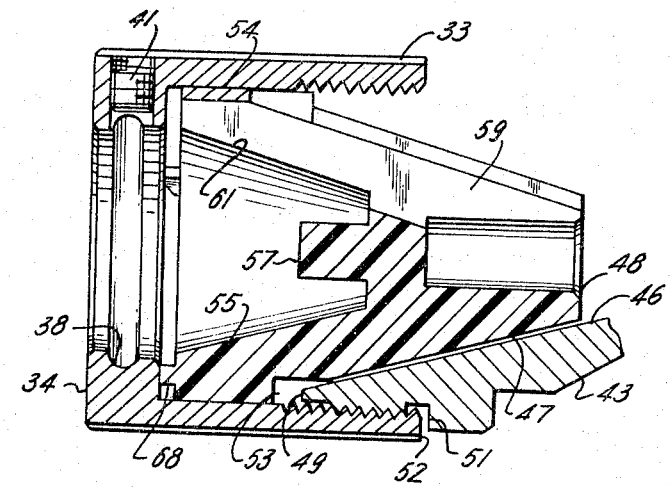
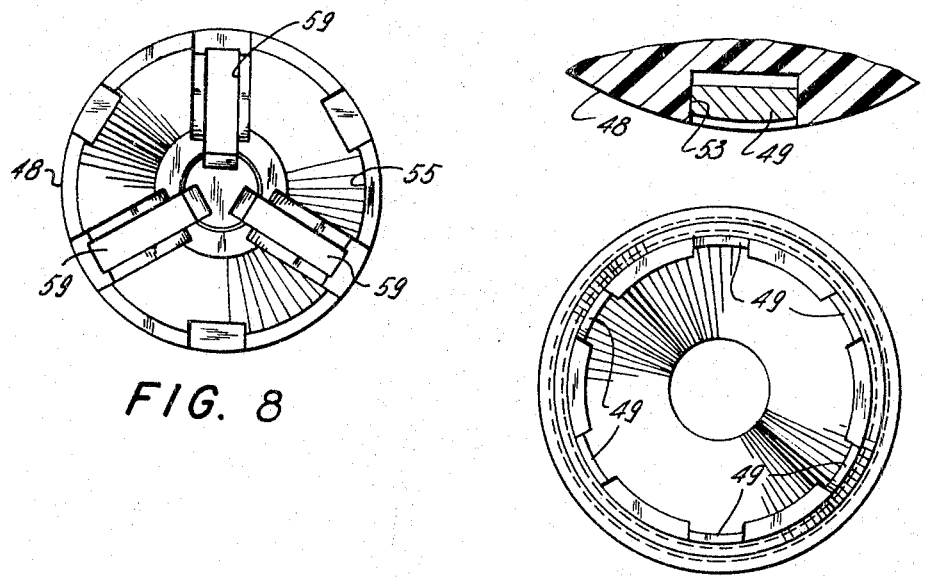

3,325,166
CHUCK JAW GUIDE MEANS
Donald J. McCarthy, Wethersfield, and Girard S. Haviland, West Hartford, Conn., assignors to The Jacobs Manufacturing Company, West Hartford, Conn., a corporation of New Jersey
Original application Jan. 3, 1964, Ser. No. 335,482, now Patent No. 3,237,955, dated Mar. 1, 1966. Divided and this application June 17, 1965, Ser. No. 464,700
6 Claims. (Cl. 279—63)

This application is a division of our co-pending parent application, Ser. No. 335,482, filed Jan. 3, 1964, now Patent No. 3,237,955.

This invention relates to rotary power tools, especially those of the compact type, having a chuck mounted upon a driving spindle which spindle tends to be rotated or carried around by the chuck as the jaws of the latter are being actuated to open or closed condition.

The parent application is directed essentially to a manually operable spindle lock mechanism for restraining the driving spindle against rotation while the jaws of the chuck are being actuated to open or closed condition.

The chuck is of a type having a tapered screw attachable to a driving spindle and a jaw actuating unit is mounted on the tapered screw for relative rotation to cause the jaws of the chuck to ride along the screw to open or closed condition.

A general object of this invention is to improve the construction of the chuck and to provide a balanced, lightweight rotatable jaw actuating unit.

A feature of the invention lies in means forming a part of the jaw actuating unit which functions to guide the jaws in their movement relative to the tapered screw.

The foregoing and other objects and features of this invention will appear more fully hereinafter from a consideration of the detailed description which follows, taken together with the accompanying drawings wherein an embodiment of the invention is illustrated. It is to be expressly understood, however, that the drawings are for purposes of illustration and description and they are not to be construed as defining the limits of the invention.

In the accompanying drawings:

FIG. 1 is a longitudinal section through the nose end of a manually portable rotary power tool embodying the invention;

FIG. 2 is a side elevational view showing the spindle lock moved to its locking position and showing the chuck jaws to have been moved from the open condition of FIG. 1 to closed condition;

FIG. 7 is a fragmentary longitudinal sectional view showing the relation of the nosepiece to the jaw guide member and the relation of the latter to the sleeve member before the nosepiece has been fully tightened upon the jaw guide;

FIG. 8 is a view of the right end of the jaw guide;

FIG. 9 is a view of the left end of the nosepiece; and

FIG. 10 is a sectional detail taken on line 10—10 of of FIG. 1 showing the interlocking relation of the nosepiece with the jaw guide member.

Figure 4:
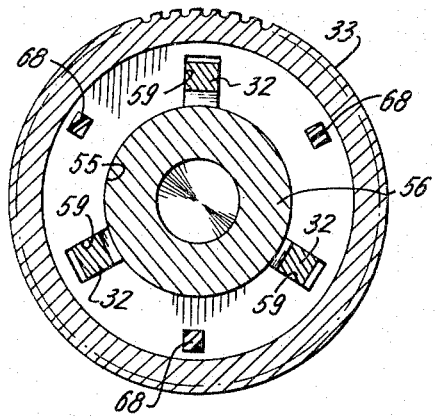
FIG. 4 is a sectional view taken on line 4—4 of FIG. 1.
Figure 6:
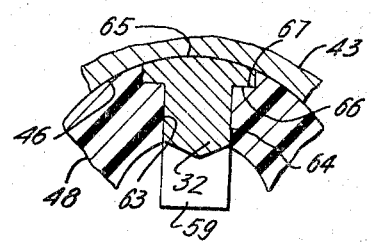
FIG. 6 is a sectional detail taken on line 6—6 of FIG. 1 showing a jaw member seated in a track of the jaw guide member.

In the accompanying drawings illustrating the invention there is disclosed in FIG. 1 the nose end of the casing 20 of a portable rotary power tool. The casing, only a fragmentary portion of which is shown, is of conventional configuration adapted to hold the spindle. The casing has fitted in its nose end a bearing 21 in which the spindle 22 is supported for rotation. The spindle is driven by a rotary motor, not shown. A threaded end 23 of the spindle projects externally of the casing 20. Threadedly mounted upon this end of the spindle for rotation by the latter is a chuck, generally designated 24. The chuck includes a tapered screw shaft body 25 (FIG. 1) having an internally threaded axial rear recess 26 in which the end 23 of the spindle is tightly threaded, so that the screw body 25 and spindle 22 rotate as a unit. In this threaded engagement the rear end face 27 of the screw body 25 limits against an annular shoulder 28 of the spindle and is disposed in close relation to the front end face 29 of the casing 20. The screw body 25 can be considered in effect as an extension of the spindle.

Supported on the screw body for relative rotation is a jaw actuating unit 31. When rotated relative to the screw body, this unit, according to its direction of rotation, causes jaw elements 32 of the chuck to move toward open or closed condition. This unit includes a cylindrical open ended sleeve 33 (FIGS. 1, 7) having an annular thick radial flange 34 at its rear. This flange sleeves with a slight clearance a cylindrical portion 36 formed intermediately of the ends of the screw body. This flanged end of the sleeve is supported upon a ring of ball bearings 37 for rotation relative to the screw body. The bearings are freely rotatable in and fill a raceway defined by a pair of opposed complementary annular grooves 38, 39, one of which is formed in the flange of the sleeve and the other of which is formed in the screw body. A radial hole 41 in the flange 34 communicating with the raceway serves as a means for entering the bearings into the raceway. A set screw 42 serves to confine the bearings to the raceway against escape. An open ended nosepiece 43 has an externally threaded rear portion 44 engaged with internal threads 45 of the sleeve. Extending axially through the nosepiece is a coned opening 46 in which is seated an axial forwardly extending coned portion 47 of a jaw guide member 48. The nosepiece (FIGS. 1, 9) has a plurality of circumferentially spaced rearwardly extending lugs 49, here six in number (FIGS. 1, 10, 9). When the sleeve member 33 is threaded over the rear portion of the nosepiece 43 and the nosepiece is drawn tightly into the sleeve until limited (FIG. 1) by abutment of a shoulder 51 of the nosepiece with the end wall 52 of the sleeve, the lugs 49 are slidably drawn into individual notches 53 (FIGS. 1, 10) formed in a cylindrical rear portion 54 of the jaw guide. This effects an interlocking engagement of the nosepiece and jaw guide (FIGS. 1, 10) whereby the sleeve, nosepiece and jaw guide become rotatable as a unit relative to the screw body 25.

The jaw guide 48 has an axially extending coned recess 55 in its rear. By means of this recess, the jaw guide sleeves over and is free to rotate relative to the peripheral surface of a forwardly extending screw formation 56 of the screw body. This screw portion extends beyond the radial flange 34 of the sleeve into the interior of the latter. A cylindrical pilot 57 extending axially from the bottom of the coned recess of the jaw guide extends into an axial bore 58 formed in a truncated front end of the screw body and bears therein for relative rotation. The jaw guide has (FIGS. 4, 6, 7, 8) three inclined or angularly extending tracks or jaw guide slots 59 converging toward each other and spaced equally apart. In each slot is slidably disposed a jaw member 32 for guided movement to open and closed condition. These slots open at their rear portions, as at 61 (FIGS. 2, 7) into the coned rescess 55. Each jaw has along the underside of its rear portion threads 62 which project through the openings 61 into the coned recess 55 and engage with the threads of the tapered screw formation 56.

Rotation of the sleeve member acts through the nosepiece and the jaw guide to carry the jaws 32 rotatively relative to the tapered screw whereupon the jaws are caused to threadedly ride up or down the tapered screw to open or closed condition accordingly as the sleeve is rotated in one direction or other other. The fully open and closed conditions of the jaws are shown respectively in FIGS. 1 and 2. The jaws are guided in their movement by means of the elongated slots 59 (FIGS. 6 and 7), the side walls 63 of which bear against opposed flat faces 64 of the jaws. Each jaw is further equipped for guided movement along its related slot by means of an arcuate back portion 65 (FIGS. 1, 6), the arcuate surface of which is exposed through the jaw slot 59 and bears against the internal wall 46 of the nosepiece as the jaw rides along its slot. This back portion overhangs the side faces of the jaw and defines a pair of shoulders 66 which ride upon complementary shoulders 67 of the slots.

Figure 3:
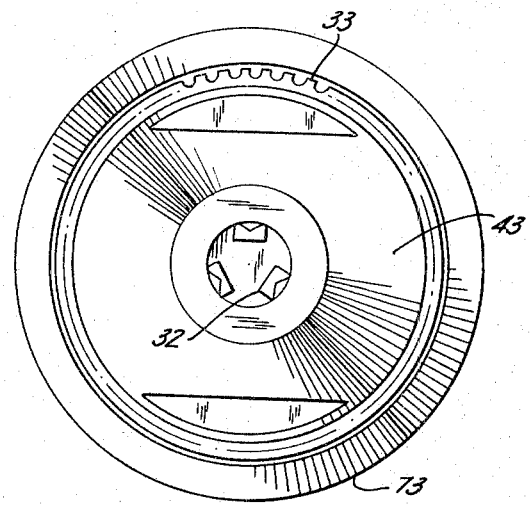
FIG. 3 is a view of the right or front end of FIG. 1.
Figure 5:
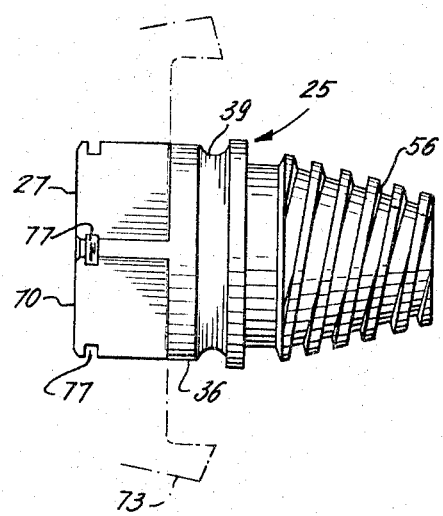
FIG. 5 is a detail in side elevation of the screw shaft body of the chuck.

The peripheral surface of the sleeve 33 is serrated, as indicated in FIGS. 2, 3 and 4, to enable convenient manual gripping of the sleeve to effect rotation of the rotatable jaw actuating unit 31. The latter unit has a balanced support upon the screw body 25 due to the bearings 37 which support its rear end and due to the pilot bearing 57 which supports its forward end. This balanced support enables easy and smooth rotation of the jaw actuating unit on the screw body with a minimum of friction and with the exertion of a minimum of manual effort. The pilot bearing 57 is of further advantage in that during assembly of the jaw actuating unit it serves to axially center the jaw guide 48 relative to the nosepiece 43. A further construction feature of the jaw actuating unit 31 is its light weight. This reduces rotational inertia which reduces the tendency of the chuck to open when the spindle is suddenly stopped. It is also a distinct advantage in the lightening of portable tools. This light weight is effected by forming the jaw guide of light weight material, such as plastic or aluminum. The plastic construction of the jaw guide also enables a tight and accurately seated relation of the jaw guide in the nosepiece and in the sleeve. To further obtain this accurate axial relation, the jaw guide has a group of equally spaced lugs 68 (FIGS. 1, 4, 7) extending rearwardly from its end wall. In the operation of assembling the rotatable unit, the sleeve 33 is threaded onto the nosepiece, causing the latter to be drawn inwardly. In moving inwardly of the sleeve, the interior wall of the coned opening 46 of the nosepiece seats over the coned extension 47 of the jaw guide, and forces the jaw guide rearwardly to abut the end lugs 68 against the flange 34 of the sleeve. As the nosepiece is further tightened and drawn inwardly until an annular shoulder 51 thereof abuts the end wall 52 of the sleeve, the lugs 68 are crushed against the flange 34 and the jaw guide 48 becomes tightly squeezed and seated in the coned opening of the nosepiece 43. The crushable nature of the lugs also serves to compensate for various axial tolerances in the nosepiece, jaw guide and sleeve by enabling the jaw guide to move into the nose piece to the extent needed to seated condition. The piloted relation of the jaw guide to the chuck body also serves as an aid to accurately position the nosepiece relative to the screw body 25 of the chuck.

When attempting to rotate the jaw actuating unit 31 to obtain a gripping condition of its jaws about a workpiece, or when attempting to release the jaws from gripping condition, there is a tendency, because of the frictional relation of the threads of the jaws to the screw portion 56 of the chuck body, for the spindle and screw body to also rotate. As a consequence, difficulty is experienced in tightening or releasing the jaws relative to the workpiece. This difficulty is avoided in the present invention by means of a manipulative spindle locking mechanism, generally indicated at 72 (FIGS. 1–2).

This spindle locking mechanism includes a manually slidable collar 73 limited to axial sliding movement on a rearwardly extending squared extension 70 of the screw body of the chuck relative to the front end of the casing 20. The collar is manually slidable so as to carry a group of rearwardly extending lugs 74 thereon into locking relation, as in FIG. 2, with slots 75 formed in the end face 29 of the casing, whereby rotation of the driving spindle 22 and the associated chuck screw body 25 are restrained. While the collar is manually held in locked relation to the casing the jaw actuating unit may be manually rotated and the jaws thereof caused to be tightened or released from gripping condition. Upon manual released of the collar, a return spring 76 anchored in peripheral grooves 77 of the chuck screw body functions to disengage the collar relative to the casing.

What is claimed is:

1. A jaw guide member for guiding to open and closed condition the jaws in a chuck, which chuck includes a shaft body, a sleeve provided with a flange and rotatably mounted on the shaft body, and further includes a nosepiece movable into an open front end of the sleeve provided with a coned interior; the jaw guide member having a body provided with angular slots for accommodating the jaws of the chuck, a forwardly extending truncated coned portion adapted to be tightly seated in the coned recess of the nosepiece upon drawing the nosepiece tightly into the open front end of the sleeve, and a plurality of crushable lugs extending from the rear of the jaw guide adapted to be pressed and crushed against the flange of the sleeve under pressure of the nosepiece as the nosepiece is drawn tightly into the sleeve over the coned portion of the jaw guide, whereby the coned portion of the jaw guide is caused to be tightly and axially seated in the nosepiece.

2. A jaw guide member as in claim 1, wherein the jaw guide is formed of a mouldable material.

3. A jaw guide member as in claim 2, wherein the material forming the jaw guide is light in weight.

4. A jaw guide member for guiding to open and closed condition the jaws in a chuck, which chuck includes a sleeve provided with a flange rearwardly arranged with respect to a nosepiece which is threadable into an open front end of the sleeve and provided with coned interior; the jaw guide member having a body provided with angular slots for accommodating the jaws of the chuck, a forwardly extended truncated coned portion adapted to be tightly seated in the cone recess of the nosepiece upon threadedly drawing the nosepiece tightly into the open front end of the sleeve, and a plurality of crushable lugs extending from the rear of the jaw guide adapted to be pressed and crushed against the flange of the sleeve under pressure of the nosepiece as the nosepiece is threadedly drawn tightly into the sleeve over the coned portion of the jaw guide, whereby the coned portion of the jaw guide is caused to be tightly and axially seated in the nosepiece.

5. In a chuck including a sleeve, a group of jaws having radially and longitudinal movement in the sleeve, the sleeve having an inturned annular flange at its rear and an open front end, a nosepiece axially mountable into the front end of the sleeve having a coned rear recess for radially contracting the jaws, means for drawing the nosepiece tightly into the sleeve; a jaw guide for guiding the jaws as they move, the jaw guide being insertable into the open end of the sleeve prior to mounting the nosepiece in the sleeve and having a group of axially extending legs abuttable against the flange of the sleeve and having a truncated coned end slidably receivable in the coned recess of the nosepiece as the latter is drawn into the sleeve, and the legs being crushable as the nosepiece is drawn to a certain degree into the sleeve over the coned end of the jaw guide.

6. A jaw guide as in claim 5, wherein lug and slot means is provided for interlocking the nosepiece with the jaw guide against relative rotation.

No references cited.

ROBERT C. RIORDON, *Primary Examiner.*

E. A. CARPENTER, *Assistant Examiner.*